US010958955B1

(12) United States Patent
Kumar (10) Patent No.: US 10,958,955 B1
(45) Date of Patent: Mar. 23, 2021

(54) SYSTEM FOR GENERATING MODIFIED VIDEO OUTPUT

(71) Applicant: AMAZON TECHNOLOGIES, INC., Seattle, WA (US)

(72) Inventor: Jatin Kumar, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 56 days.

(21) Appl. No.: 16/130,701

(22) Filed: Sep. 13, 2018

(51) Int. Cl.
H04N 21/258 (2011.01)
H04N 5/341 (2011.01)
G06F 1/16 (2006.01)
H04N 5/232 (2006.01)

(52) U.S. Cl.
CPC ..... H04N 21/25825 (2013.01); G06F 1/1626 (2013.01); H04N 5/232127 (2018.08); H04N 5/341 (2013.01); *G06F 2200/1637* (2013.01)

(58) Field of Classification Search
CPC ....... G06T 3/40; G06T 3/60; G09G 2340/045; G09G 2340/0492; H04N 19/167; H04N 21/234345; H04N 21/440245; H04N 21/4728; H04N 21/25825; H04N 5/232127; H04N 5/341; G06F 2200/1614; G06F 2203/04806; G06F 1/1626; G06F 2200/1637
See application file for complete search history.

(56) References Cited

U.S. PATENT DOCUMENTS

| | | | |
|---|---|---|---|
| 8,290,062 B1* | 10/2012 | Chen | H04N 19/40 375/240.25 |
| 2006/0215753 A1* | 9/2006 | Lee | H04N 7/147 375/240.08 |
| 2006/0227997 A1* | 10/2006 | Au | G06K 9/00771 382/103 |
| 2006/0239645 A1* | 10/2006 | Curtner | G08B 13/19606 386/228 |
| 2009/0232203 A1* | 9/2009 | Jayant | H04N 19/164 375/240.02 |
| 2014/0022329 A1* | 1/2014 | Kim | H04N 7/147 348/14.03 |
| 2015/0023650 A1* | 1/2015 | Austin | H04N 21/4314 386/241 |
| 2018/0376212 A1* | 12/2018 | Candelore | H04N 21/4728 |

* cited by examiner

*Primary Examiner* — Jeffery A Brier
(74) *Attorney, Agent, or Firm* — Lindauer Law, PLLC (57) ABSTRACT

Techniques for modifying video data to be displayed using a particular output device include receiving initial video data that includes a first set of pixels. A focal region within the pixels is determined automatically or through user input. Viewing data is generated based on the focal region. The viewing data indicates a boundary of a subset of the pixels of the initial video data. The subset has at least one dimension smaller than a corresponding dimension of the first set of pixels. The initial video data is modified, based on the viewing data, to form modified viewing data that includes the subset of pixels and the focal region. The modified video data may then be output using a display having different dimensions or other characteristics than a device used to output the initial video data.

20 Claims, 6 Drawing Sheets

SYSTEM FOR GENERATING MODIFIED VIDEO OUTPUT

BACKGROUND

Images and videos may be output using a variety of different output devices that differ in size, shape, or orientation.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When recording a video or capturing an image, various characteristics of the recording or capturing device, such as the lens, image sensor, aspect ratio, and so forth, may affect the field of view that is represented by the image. The field of view affects the quantity of pixels used to represent the video or image. The orientation of a recording device may also affect the characteristics of the resulting video or image. For example, a camera associated with a smartphone may generate video data representing one or more images. The images may include a set of pixels having a height (e.g., a first dimension) greater than its width (e.g., a second dimension orthogonal to the first dimension) when the smartphone is oriented vertically (e.g., in "portrait mode"), and a set of pixels having a width greater than its height when the smartphone is oriented horizontally (e.g., in "landscape mode"). In some cases, a different device, other than the recording device, may be used to view a video or image. In such cases, the display associated with the viewing device may have characteristics that differ from those of the display, camera, and other elements of the recording device. For example, the display of a computer monitor, television, or other type of viewing device may have a different size, shape, or resolution than the display associated with a recording device. Additionally, the display of a viewing device may be shaped or oriented differently than the orientation of the recording device. For example, a recording device may be used to acquire a video while oriented horizontally, in landscape mode, while the viewing device is oriented vertically, in portrait mode. Continuing the example, when a recording device in landscape mode is used to generate video data, the video data may represent a set of pixels having a width greater than its height. When this video data is output using a display oriented in portrait mode, the display of the viewing device may have a width less than that of the set of pixels and a height greater than that of the set of pixels. As a result, to output all of the pixels represented by the video data using the viewing device, the size of the output may be reduced so that the entire width of the pixels of the video data may fit within the smaller width of the display of the viewing device. In such a case, this reduction in the size of the output may cause portions of the display device above or below the output to be unused, because only a portion of the vertical height of the display is necessary to output the video due to the height of the set of pixels being less than that of the display.

Described in this disclosure are techniques for modifying video data generated by a recording device based on user input or characteristics of a viewing device such that only a subset of the pixels represented by the video data are output, but a focal region of the pixels remains displayed. Video data corresponding to a first set of pixels may be generated by a recording device. The first set of pixels may have a first set of dimensions. For example, a set of pixels recorded by a smartphone oriented in landscape mode may have a width greater than a height. A focal region of the first set of pixels may be determined based on user input or automatic detection of one or more characteristics of the pixels. A focal region may include a single point (e.g., a focal point), or multiple points that are proximate to one another. In some implementations, object recognition may be automatically used to identify one or more living beings, human faces, motion, object types, particular objects, and so forth, and an identified characteristic of the pixels, such as the location of an object, may be used as a focal region. In other implementations, user input may be used to indicate the focal region. For example, user input may be used to specify an object or type of object, such as a human face. As another example, user input may be used to specify a particular focal point or focal region, such as by interaction with a touch sensor, mouse device, or other type of input device to select one or more points within the first set of pixels. As yet another example, user input may be used to indicate a boundary surrounding a subset of the first set of pixels. As still yet another example, user input may include data or metadata associated with a video, such as a title or category associated with the video. Continuing the example, user input may include a title, category, written text, or other data indicating that a video is associated with sale of a particular type of item, such as a cellular telephone, and in response to the indication, the location of a cellular telephone within the video data may be determined and used as a focal region. In other implementations, characteristics of a video may be used to determine a focal region. For example, if a video includes multiple speech utterances of the term "camera", this may indicate that the video is associated with cameras, and the location of one or more cameras may be determined and used as a focal region.

Viewing data may be generated based on the determined focal region. Viewing data may include an indication of a subset of the first set of pixels that corresponds to a boundary of a second set of pixels contained within the first set. For example, if the first set of pixels corresponds to a landscape mode of a smartphone, the viewing data may correspond to a boundary surrounding a subset of the first set of pixels that has a width less than that of the first set and a height generally equal to that of the first set, for output using a smartphone oriented in portrait mode. Continuing the example, due to the reduced width of the second set of pixels, the second set of pixels may be output on a display oriented in portrait mode without reducing the size of the second set of pixels. In other cases, due to the reduced width of the second set of pixels, a lesser reduction in size than that which would be applied to the first set of pixels may be used. As a result, a larger portion of the vertical height of the display may be occupied by the second set of pixels, and a smaller region of the display may remain unused.

The viewing data may include any number of boundaries of any number of regions within the first set of pixels. For example, a first boundary may be associated with output of a subset of the first set of pixels on a display oriented in landscape mode, a second boundary may be associated with output of a subset of the first set of pixels on a square-shaped display, a third boundary may be associated with output of a subset of the first set of pixels on a display oriented in portrait mode, and a fourth boundary may be associated with output of a subset of the first set of pixels on a round or elliptical display. The boundaries indicated in the viewing data may be transmitted as a separate file that accompanies the video data, such as a companion metadata file, or the boundaries may be included (e.g., embedded) in the video data. In other implementations, data indicative of the focal region may be provided to a viewing device, and the viewing device may generate viewing data, determine a boundary, or modify the video data based on the location of the focal region.

In some implementations, the viewing data may be generated based on user input. For example, user input indicating a boundary of a subset of the first set of pixels may be provided using one or more input devices. In other implementations, the viewing data may be generated automatically. For example, after determining a focal region within the first set of pixels, one or more boundaries associated with different types of display devices may be generated that include the focal region at the approximate center thereof. As another example, if a focal region is located proximate to an edge of a set of pixels, the boundary associated with the viewing data may include the edge of the set of pixels, such that each point of the boundary is included within the pixels of the initial video data. In still other implementations, the viewing data may be generated based on one or more characteristics of the viewing device. For example, one or more characteristics of the display of the viewing device, such as a dimension or shape of the display, may be determined. The viewing data may then be generated to include a boundary corresponding to the determined size or shape of the display. In some implementations, multiple methods may be used to generate viewing data. For example, viewing data may be automatically generated based on the determined location of an object within a video, then user input may be used to modify the boundary for one or more frames of the video.

The viewing data may be used to modify the initial video data to form modified video data indicative of a second set of pixels contained within the first plurality of pixels. In some implementations, the modified video data may be generated prior to transmitting the modified video data to a viewing device. For example, if the viewing device includes a display having a fixed size, shape, resolution, or orientation, the viewing data corresponding to a boundary for the display characteristics of the viewing device may be used to generate the modified video data prior to transmission of the modified data to the viewing device. In other implementations, the initial video data and the viewing data may be provided to the viewing device, and based on one or more characteristics of the viewing device, the initial data may be modified using at least a portion of the viewing data. For example, while the viewing device is oriented in portrait mode, modified video data corresponding to a first boundary of the viewing data may be output, and while the viewing device is oriented in landscape mode, modified video data corresponding to a second boundary of the video data may be output. As the orientation of the viewing device changes, the video data output by the viewing device may be modified using a boundary of the viewing data that corresponds to the current orientation of the viewing device. In still other implementations, data indicative of a focal region may be provided to the viewing device, and the viewing device may generate viewing data, determine a boundary, or modify the video data based on the location of the vocal region.

In some implementations, the boundary associated with the viewing data may move within the first set of pixels as the determined focal region moves. For example, if the focal region is determined to include a living being or moving object, the location of the being or object may change in successive frames of a video. The viewing data for each frame may position one or more boundaries such that the determined being or object remains within a threshold distance of a center or other selected region of the second set of pixels. In some implementations, if movement of the focal region results in movement of the second set of pixels by a distance greater than a threshold distance, the boundary for the second set of pixels may instead be moved by a distance less than or equal to the threshold distance to maintain the continuity of a user's viewing experience. In other implementations, to reduce the data storage used to store each frame of a video, the change in the position of a focal region or boundary relative to a previous frame of the video may be stored in lieu of storing data indicating the position of each pixel of a boundary for each frame.

As one skilled in the art will appreciate in light of this disclosure, certain embodiments may be capable of achieving certain advantages, including some or all of the following: generation of viewing data corresponding to one or more display areas that differ from those of a recording device may enable a video output to be optimized to occupy a larger portion of a display having a different size, shape, or orientation than that of the recording device. In addition to occupying a larger portion of a display, the optimized video output may focus on, and in some cases enlarge, a focal region of the video output, improving user visualization of a selected portion of a video. Generation of viewing data corresponding to multiple display areas may enable the portion of an initial video that is output to automatically change as the orientation of a viewing device changes. Additionally, generation of viewing data associated with a particular object or other focal region of a video may enable the portion of the video that is output to a display device to change as the focal region moves within the field of view of the recording device. Use of viewing data to modify video data may enable a single video file to be provided to multiple devices, while optimizing the display area for each viewing device, reducing storage and processing costs.

Figure 1:
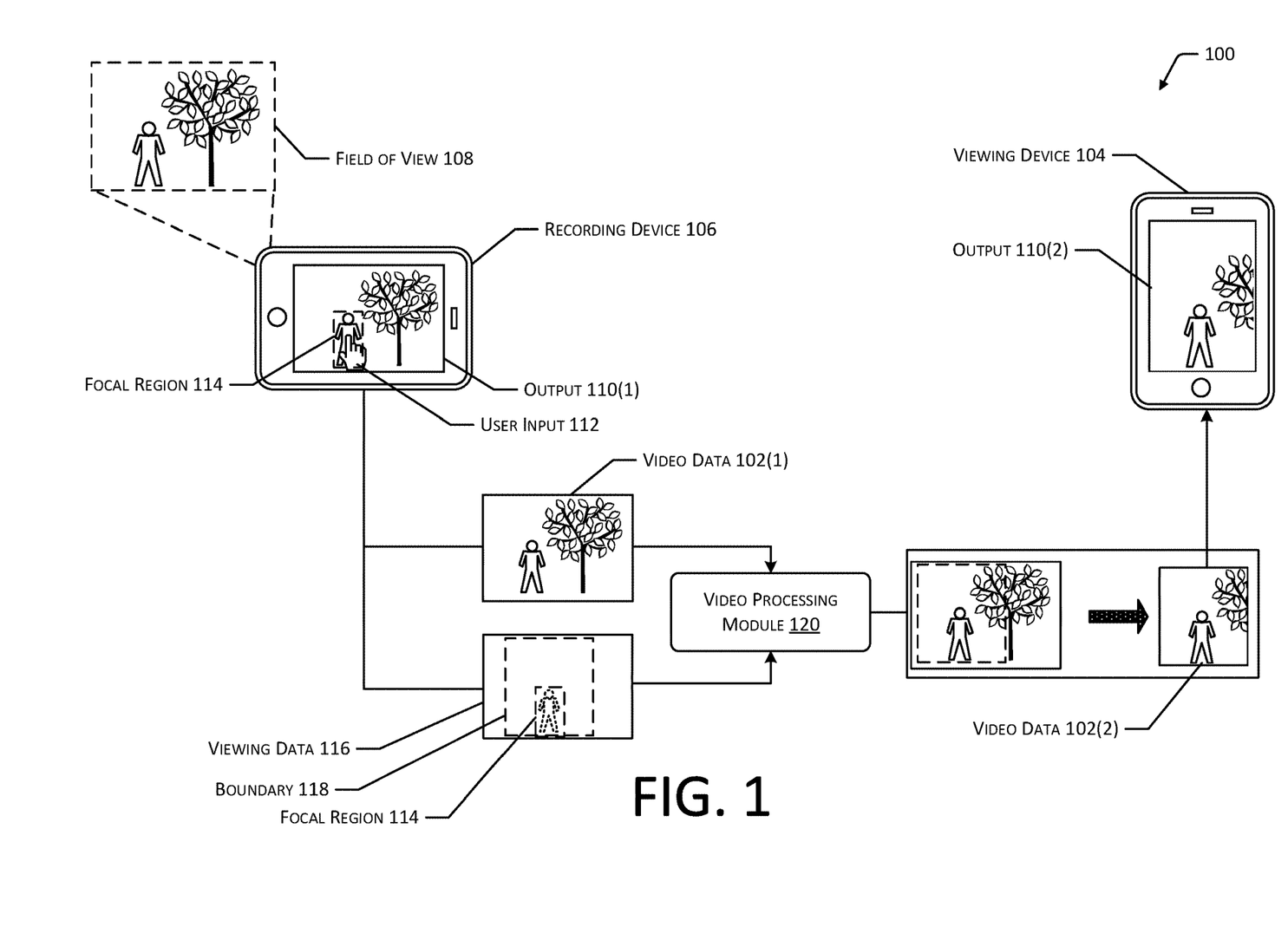
FIG. 1 depicts an implementation of a system for modifying video data for presentation on a viewing device having different characteristics than a recording device.

FIG. 1 depicts an implementation of a system 100 for modifying video data 102 for presentation on a viewing device 104 having different characteristics than a recording device 106. A recording device 106 may be used to generate image data or video data 102(1) that includes pixels representing a field of view 108 of a camera or image sensor associated with the recording device 106. For example, FIG. 1 depicts the recording device 106 as a smartphone having a camera that may be used to generate video data 102(1) representative of the field of view 108 of the camera. While FIG. 1 depicts the recording device 106 as a smartphone, in other implementations, the recording device 106 may include any type of computing device, camera, or other type of device able to acquire image data or video data 102. The field of view 108 may include various characteristics based on the characteristics of the recording device 106. For example, based on the camera, lens, and other hardware or software components of the recording device 106, the field of view 108 may include a particular size or shape. Continuing the example, FIG. 1 depicts the recording device 106 as a smartphone oriented horizontally (e.g., in landscape mode). As a result, the field of view 108 may include a rectangular area having a width greater than its height.

In some implementations, the recording device 106 may include one or more output devices. For example, FIG. 1 depicts the recording device 106 including a display. The output device may be used to present output 110(1) indicative of the generated video data 102(1). For example, the display of a smartphone may be used to output a video corresponding to the video data 102(1) acquired using the camera of the smartphone. In other implementations, an output device separate from the recording device 106 may be used to provide output 110(1) corresponding to the video data 102(1). For example, a camera lacking a display device may be used to generate video data 102(1), while a separate computing device having a display may receive the video data 102(1) and output a video. The recording device 106, or another computing device that receives the video data 102(1) may also include one or more input devices that receive user input 112 for interacting with or otherwise manipulating the output 110(1) or the video data 102(1). For example, a smartphone may include a touch sensor that may receive user input 112 via a user providing a touch or gesture to a touchscreen. The user input 112 may indicate a focal region 114 within the output 110(1). For example, a user of the recording device 106 may select a particular object, point, or region within the output 110(1) that is of importance to the user. Continuing the example, a user acquiring a video of a particular individual may provide user input 112 indicating a focal region 114 of the output 110(1) that corresponds to the location of the particular individual within the output 110(1).

The recording device 106, the viewing device 104, or another computing device that receives the video data 102(1) may also generate viewing data 116 corresponding to the characteristics of one or more viewing devices 104. For example, a viewing device 104 may include an output device having different characteristics than those of the field of view 108, such as a different size or shape. Continuing the example, FIG. 1 depicts the viewing device 104 as a smartphone that is oriented vertically (e.g., in portrait mode), such that the display device of the smartphone has a rectangular shape with a height greater than its width. If the video data 102(1) corresponding to the field of view 108, which has a width greater than its height, were used by the viewing device 104 to output a video, the physical size of the video would be reduced such that all of the pixels associated with the larger width of the field of view 108 are able to fit within the smaller width of the display of the viewing device 104. As a result, a portion of the vertical height of the display of the viewing device 104 would remain unused while outputting the video. Viewing data 116 that corresponds to the characteristics of the viewing device 104 may be used to modify the video data 102(1), based on the focal region 114, to improve the quality of the video output by the viewing device 104.

Specifically, the viewing data 116 may include an indication of a subset of pixels within the video data 102(1) that correspond to a boundary 118 of a smaller region within the output 110(1). The boundary 118 may define a subset of the output 110(1), that includes the focal region 114, having one or more dimensions smaller than that of the field of view 108. For example, FIG. 1 depicts the viewing data 116 including a boundary 118 enclosing a subset of pixels having a width less than that of the field of view 108 and a height approximately equal to that of the field of view 108, that includes the focal region 114 at the approximate center of the width of the region. In other implementations, the focal region 114 may be positioned at a different location within the region defined by the boundary 118. For example, if the focal region 114 is proximate to the edge of the field of view 108, the boundary 118 may be positioned at or proximate to the edge of the field of view 108, and the focal region 114 may be proximate to the edge of the boundary 118. While FIG. 1 depicts the viewing data 116 including a single boundary 118, in other implementations, the viewing data 116 may include multiple boundaries 118, each of which may correspond to a different type of output device. For example, a first boundary 118 may correspond to a smartphone oriented vertically, a second boundary 118 may correspond to a smartphone oriented horizontally, a third boundary 118 may correspond to a square-shaped display, a fourth boundary 118 may correspond to a round display, and so forth.

The recording device 106, or another computing device that receives the video data 102(1), may provide the video data 102(1) and the viewing data 116 to a video processing module 120. In some implementations, the video processing module 120 may be stored in association with the viewing device 104. In other implementations, the video processing module 120 may be stored in association with the recording device 106. In still other implementations, the video processing module 120 may be stored in association with a computing device separate from the recording device 106 and the viewing device 104, such as a server in communication with the recording device 106 and viewing device 104. Independent of the computing device associated with the video processing module 120, the video processing module 120 may generate modified video data 102(2) based on the initial video data 102(1), the focal region 114, and the viewing data 116. For example, the video processing module 120 may crop or otherwise remove, disregard, or prevent output of pixels of the initial video data 102(1) that are located outside of the boundary 118. As a result, the modified video data 102(2) may cause the viewing device 104 to output a video having a width smaller than the width associated with the field of view 108, enabling a larger portion of the display of the viewing device 104 to be utilized to output the video. For example, FIG. 1 depicts the viewing device 104 presenting output 110(2) corresponding to the modified video data 102(2). The output 110(2) associated with the viewing device 104 is shown having a width less than that of the output 110(1) associated with the recording device 106 and a height generally equal to that of the output 110(1) associated with the recording device 106. As a result, the output 110(2) presented by the viewing device 104 may utilize a larger portion of the display area of the viewing device 104 than the area that would be occupied by output 110 corresponding to the initial video data 102(1). Additionally, display of the smaller subset of pixels using the viewing device 104 may enable the focal region 114 of the output 110(2) to be enlarged, improving visibility of the focal region 114 to users.

Figure 2:
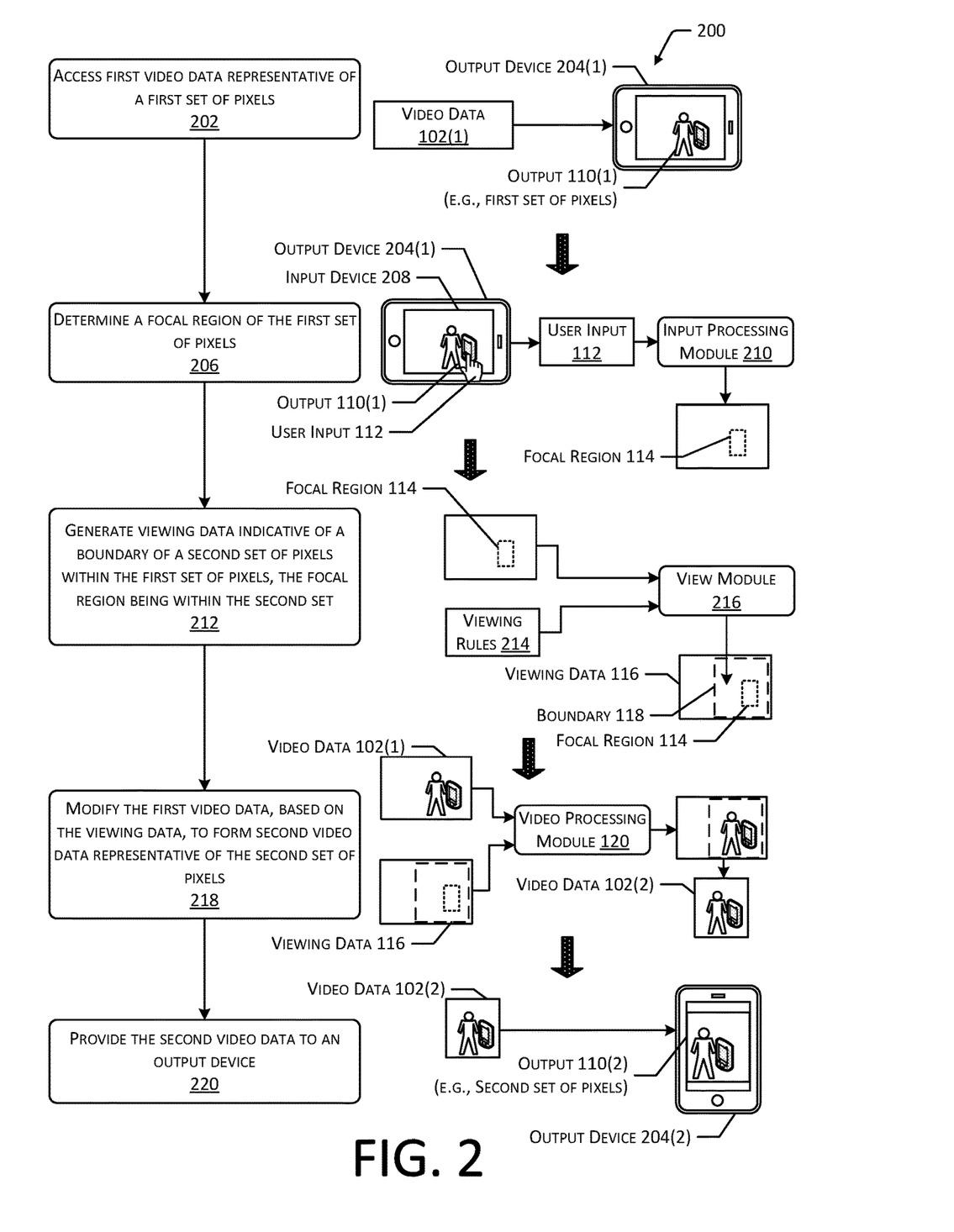
FIG. 2 is a scenario illustrating a method for generating modified video data based on a determined focal region and viewing data associated with initial video data.

FIG. 2 is a scenario 200 illustrating a method for generating modified video data 102(2) based on a determined focal region 114 and viewing data 116 associated with initial video data 102(1). At 202, first video data 102(1) representative of a first set of pixels may be accessed. For example, first video data 102(1) may be generated by a recording device 106, and the recording device 106 may be used for one or more of determination of a focal region 114, generation of viewing data 116, or modifying of the first video data 102(1) to form second video data 102(2) (e.g., modified video data). In other implementations, existing first video data 102(1) may be accessed subsequent to generation of the first video data 102(1) by a recording device 106. For example, the recording device 106, or a separate computing device, may be used to access video data 102(1) that was generated by a recording device 106 during a previous time period. In some implementations, when the first video data 102(1) is accessed, output 110(1) indicative of the first set of pixels may be generated, such as by providing the video data 102(1) to an output device 204(1) that includes a display.

At 206, a focal region 114 within the first set of pixels may be determined. As described with regard to FIG. 1, a focal region 114 may include a single focal point or multiple points, such as an object detected in the video data 102(1). In some implementations, user input 112 provided to an input device 208 may be used to indicate a focal region 114 within the first set of pixels. For example, an input processing module 210 associated with the recording device 106, viewing device 104, or another computing device accessing the video data 102(1) may determine the location of a focal region 114 based on the user input 112. In some implementations, the user input 112 may indicate one or more pixels within a scene represented in the output 110(1). In other implementations, object recognition may be used to determine an object that corresponds to the location of the user input 112, and the focal region 114 may be determined as the location of the object. For example, if an object moves during a video, the focal region 114 may move concurrent with the location of the object. In still other implementations, the focal region 114 may be determined automatically. For example, the input processing module 210, or another module, may be configured to determine the location of a particular object, such as a certain individual or a certain product offered for sale, a particular type of object, such as a human face or a living being, a particular color or other characteristic of a scene, motion, and so forth. The location of the detected object, object type, motion, or scene characteristic may be determined as the focal region 114 within the first set of pixels.

At 212, viewing data 116 indicative of a boundary 118 of a second set of pixels within the first set of pixels may be generated. The focal region 114 may be included within the second set of pixels. For example, a view module 216 associated with the recording device 106, viewing device 104, or another computing device accessing the video data 102(1) may generate the viewing data 116 based on the determined focal region 114 and one or more viewing rules 214. Viewing rules 214 may indicate particular values corresponding to the location of pixels within one or more boundaries 118 relative to the location of a focal region 114. For example, a first viewing rule 214 may indicate the locations of a set of pixels, relative to a focal region 114, that would constitute a boundary 118 corresponding to a portrait mode of a smartphone display. A second viewing rule 214 may indicate the locations of a set of pixels, relative to the focal region 114, that would constitute a boundary 118 corresponding to the landscape mode of a smartphone display. Other viewing rules 214 may similarly indicate the placement of boundaries 118 corresponding to square displays, round displays, or other types of displays having various shapes and dimensions. For example, FIG. 2 depicts viewing data 116 that includes a boundary 118 spaced about the focal region 114 that corresponds to the portrait mode of a smartphone. Continuing the example, the original output 110(1) based on the video data 102(1) is shown having a rectangular shape with a width greater than its height, while the viewing data 116 includes a boundary 118 with a rectangular shape having a height greater than its width. While FIG. 2 depicts viewing data 116 that includes a single boundary 118, in other implementations, the viewing data 116 may include multiple boundaries 118 that each correspond to a different output device 204.

In some implementations, viewing data 116 may be generated or modified based on user input 112. For example, a user may modify the size, shape, and position of a boundary 118 within one or more frames of a video subsequent to generation of the viewing data 116. In other cases, a user may generate a boundary 118, such as by indicating portions of an output 110 using an input device 208.

At 218, the first video data 102(1) may be modified, based on the viewing data 116, to form second video data 102(2) representative of the second set of pixels. As described with regard to FIG. 1., a video processing module 120 associated with the recording device 106, the viewing device 104, or another computing device accessing the first video data 102(1) may modify the first video data 102(1). Modification of the first video data 102(1) may include cropping, deleting, removing, obscuring, or otherwise preventing output of pixels outside of the boundary 118, such that when output 110(2) is generated based on the second video data 102(2), only the second set of pixels is output.

At 220, the second video data 102(2) may be provided to an output device 204(2). For example, providing the second video data 102(2) may include transmitting the second video data 102(2) (e.g., over a network) from a recording device 106 to a viewing device 104 for output, or from one or more servers or other computing devices storing the video data 102(2) to the viewing device 104. As another example, providing the second video data 102(2) may include storing the second video data 102(2) in data storage accessible to an output device 204(2). Continuing the example, a server or other computing device may store the second video data 102(2), which may subsequently be accessed by a viewing device 104 for output. In other cases, the viewing device 104 may store the second video data 102(2) and may access the second video data 102(2) for output using a display or other output device 204(2) associated with or in communication with the viewing device 104. In other implementations, the second video data 102(2) may be accessed by an output device 204(2) for contemporaneous buffering and output (e.g., "streaming"). For example, an output device 204(2) may begin outputting video using the second video data 102(2) before the entirety of the second video data 102(2) has been received or accessed by the output device 204(2).

As discussed previously, the viewing data 116 and the resulting modified video data 102(2) may represent a second set of pixels having a rectangular shape with a height greater than its width. As such, the second video data 102(2) may be suitable for output using a smartphone oriented in portrait mode. For example, if the first video data 102(1) were output using the output device 204(2), the larger width of the first set of pixels may cause the entire display area of the output device 204(2) to be inefficiently utilized. Continuing the example, resizing the first set of pixels may enable the width of the pixels to fit within the smaller width of the output device 204(2), and may result in portions of the height of the output device 204(2) remaining unused. Conversely, due to the correspondence between the shape of the second set of pixels and the shape of the output device 204(2), the output 110(2) corresponding to the second video data 102(2) may utilize a greater portion of the display area of the output device 204(2). Additionally, the smaller dimensions of the second video data 102(2) may enable the focal region 114 or other regions of interest within the output 110(2) to be enlarged, improving the visibility of these features.

Figure 3:
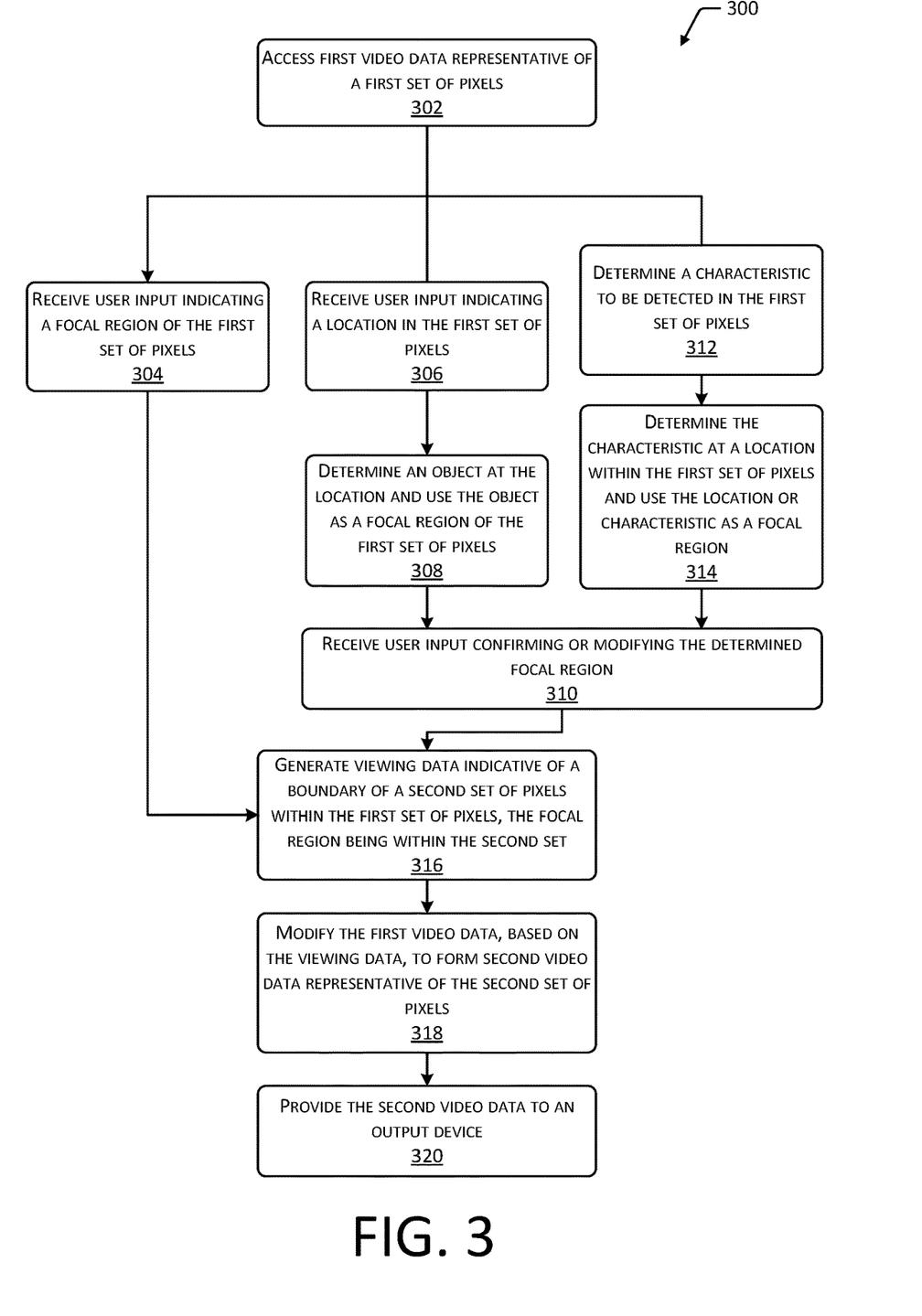
FIG. 3 is a flow diagram illustrating methods for determining a focal region to be used to generate modified video data.

FIG. 3 is a flow diagram 300 illustrating methods for determining a focal region 114 to be used to generate modified video data 102(2). At 302, first video data 102(1) representative of a first set of pixels may be accessed. As described with regard to FIG. 2, the first video data 102(1) may be accessed by a recording device 106 at or proximate to the time that the video data 102 is generated, or the first video data 102(1) may be accessed by the recording device 106 or another computing device at a future time subsequent to the generation of the video data 102. In some implementations, accessing of the first video data 102(1) may include generating output 110 based on the first video data 102(1) to enable interaction with the output 110 by a user.

As described with regard to FIGS. 1 and 2, the first video data 102(1) may be modified based on a determined focal region 114 of the video data 102 and viewing data 116 indicative of a boundary 118 within the first set of pixels that defines a second set of pixels. FIG. 3 illustrates multiple methods by which the focal region 114 within the first set of pixels represented by the video data 102 may be generated. For example, at 304, user input 112 indicating a focal region 114 of the first set of pixels may be received. Continuing the example, the video data 102 may be used to generate output 110 indicative of the first set of pixels. A user, via an input device 208, may indicate a particular location within the output 110 as a focal region 114. The focal region 114 may include a single focal point or pixel or a set of adjacent pixels. For example, the focal region 114 may include a single pixel located at a point selected by a user, all pixels touched by a user using a touch sensor, all pixels contained within a shape input by a user, and so forth.

As another example, at 306, user input 112 indicating a location within the first set of pixels may be received. Continuing the example, user input 112 received via a touch sensor, mouse device, or other type of input device 208 may indicate a particular location within output 110 generated using the video data 102. In response to the user input 112, at 308, an object represented by the pixels at the location indicated by the user input 112 may be identified, and the object may be used as a focal region 114 of the first set of pixels. For example, user input 112 may indicate a particular object, such as a human or animal, an item available for purchase, and so forth. Object recognition may be performed, in response to the user input 112, to identify an object located at or proximate to the location indicated by the user input 112. For example, user input 112 may indicate a particular individual represented within the video. In response to the user input 112, object recognition may be performed to identify the particular individual at the location of the user input 112. The location of the particular individual may then be used as the focal region 114 within each frame of the video. In some cases, if the particular individual moves, the location of the focal region 114 may change as the location of the determined object changes. In some implementations, at 310, user input 112 confirming or modifying the determined focal region 114 may be received. For example, in response to the user input 112, the location of the determined object within each frame may be used as a focal region 114. However, a user may provide user input 112 to modify the location of the focal region 114 within one or more frames of the video. In other implementations, the focal region 114 may be determined in the absence of user input 112, and block 310 may be omitted.

As yet another example, at 312, a characteristic to be detected in the first set of pixels may be determined. In some implementations, a user may provide user input 112 indicating a particular living being, object, type of object, or characteristic of a scene, such as movement or one or more colors, to be detected within the first set of pixels. For example, the user input 112 may be provided during or proximate to the time that the video data 102 is generated. In other cases, the user input 112 may include preexisting data, such as one or more default settings or configurations indicating characteristics of a scene to be detected. For example, a default setting, configuration, or rule may cause a characteristic within the first set of pixels, such as motion, a color, or a specific type of object, to be automatically detected in the absence of user input.

At 314, the presence of one or more of the characteristics indicated at 312 may be determined at a location within the first set of pixels. The determined location may be used as the focal region 114. In some cases, the determined location may include a particular object, and as the object moves, the location of the focal region 114 may move concurrent with the object. For example, within each frame of a video, the location of the focal region 114 may correspond to the detected location of an object. In other cases, the determined location may include a fixed location.

Subsequent to determining the focal region 114 within each frame of a video at 314, at 310, user input 112 may be received to confirm or modify the determined focal region 114. For example, based on the characteristics indicated at 312, a series of focal regions 114 for each frame of a video may be automatically generated. User input 112 may then be received to modify the focal region 114 within one or more of the frames. In other implementations, the focal region 114 may be determined in the absence of user input 112, and block 310 may be omitted.

Independent of the manner in which the focal region 114 for a video is determined, at 316, viewing data 116 indicative of a boundary 118 of a second set of pixels within the first set of pixels may be generated. The focal region 114 may be included within the second set of pixels. For example, as described with regard to FIGS. 1 and 2, the viewing data 116 may indicate a boundary 118 that encloses the focal region 114 and in some cases, one or more additional pixels, but excludes at least a portion of the first set of pixels.

At 318, the first video data 102(1) may be modified based on the viewing data 116, to form second video data 102(2) representative of the second set of pixels, and at 320, the second video data 102(2) may be provided to an output device 204(2). As described with regard to FIGS. 1 and 2, modification of the first video data 102(1) may include deletion of pixels located outside of the boundary 118 indicated in the viewing data 116, or suppression of output of the pixels outside of the boundary 118, such that the second set of pixels has at least one dimension smaller than that of the first set of pixels. As a result, the second set of pixels may utilize a larger portion of an output device 204 than the portion that would be used by the output device 204 to output the first set of pixels. As described with regard to FIG. 3, providing second video data 102(2) to an output device 204(2) may include transmitting the second video data 102(2) from a recording device 106, a viewing device 104, or another computing device that stores the second video data 102(2). Providing the second video data 102(2) may also include accessing the second video data 102(2) from data storage accessible to the output device 204(2). In some cases, the output device 204(2) may begin generating output based on the second video data 102(2) prior to receiving the entirety of the second video data 102(2), such as during transmission of the second video data 102(2) to the output device 204(2).

Figure 4:
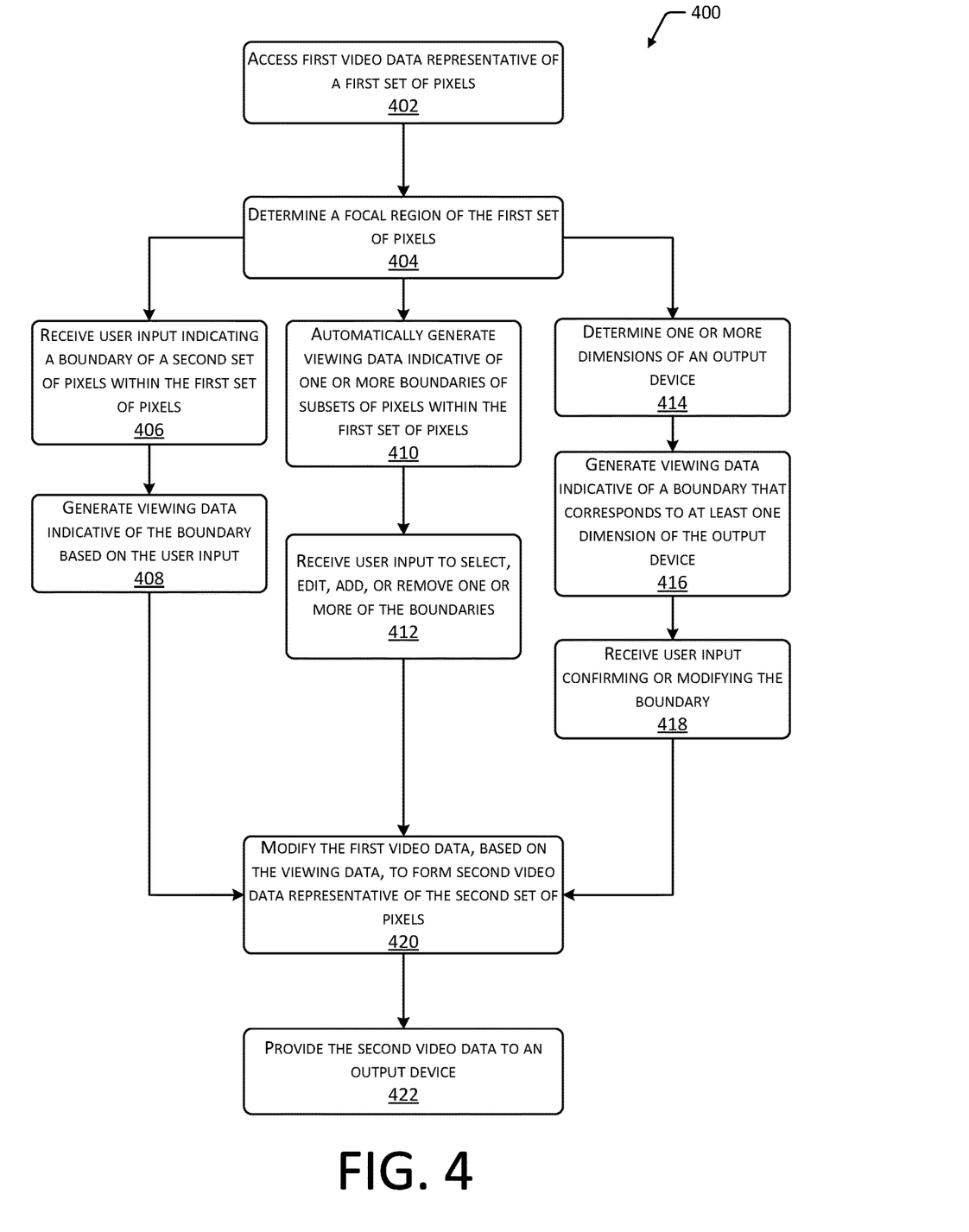
FIG. 4 is a flow diagram illustrating methods for determining viewing data that may be used to modify video data for output using one or more output devices.

FIG. 4 is a flow diagram 400 illustrating methods for determining viewing data 116 that may be used to modify video data 102 for output using one or more output devices 204. At 402, first video data 102(1) representative of a first set of pixels may be accessed. As described with regard to FIGS. 2 and 3, the first video data 102(1) may be accessed by a recording device 106 at or proximate to the time that the video data 102 is generated, or the first video data 102(1) may be accessed by the recording device 106 or another computing device at a future time subsequent to generation of the video data 102.

At 404, a focal region 114 of the first set of pixels may be determined. The focal region 114 may be determined based on user input 112 or by detection of one or more objects or other characteristics of the first set of pixels. Example methods for determining a focal region 114 of a set of pixels are described with regard to FIG. 3.

Viewing data 116 for modifying the video data 102 may be generated based in part on the determined focal region 114. For example, viewing data 116 may include data indicative of a boundary 118 of a subset of pixels within the first set of pixels, the subset including the focal region 114. FIG. 4 illustrates multiple methods by which viewing data 116 may be generated. For example, at 406, user input 112 indicating a boundary 118 of a second set of pixels within the first set of pixels may be received. Continuing the example, a user may provide user input 112 indicating locations that correspond to a boundary 118, such as by using an input device 208 to draw a shape within one or more frames of video output 110. In other implementations, user input 112 may include selection of one or more preexisting or default boundaries 118. For example, preexisting boundaries may include rectangular shapes corresponding to portrait or landscape orientations, square shapes corresponding to square display devices, round shapes corresponding to round display devices, and so forth.

At 408, viewing data 116 indicative of the boundary 118 generated or selected based on the user input 112 may be generated. In some implementations, the viewing data 116 may include multiple boundaries 118. For example, a first boundary 118 may correspond to output using a rectangular display that is vertically oriented while a second boundary 118 corresponds to output using a rectangular display that is horizontally oriented. A viewing device 104 may use a different boundary 118 of the viewing data 116 to modify video data 102 at different times based on the orientation or configurations of the viewing device 104.

As another example, at 410, viewing data 116 indicative of one or more boundaries 118 of subsets of pixels within the first set of pixels may be automatically generated. Continuing the example, one or more viewing rules 214 may indicate the position of one or more boundaries 118 based on the location of the focal region 114. For example, viewing rules 214 may indicate locations of one or more pixels, included within a boundary 118, relative to the focal region 114 and relative to the edges of a first set of pixels. Continuing the example, the viewing rules 214 may indicate a distance and direction of one or more points included in a boundary 118, relative to a focal region 114. One such boundary 118 may include points located within a rectangular shape having the focal region 114 at the approximate center of at least one dimension thereof. Another example may include points located at the edge of a set of pixels, such as when a focal region 114 is located proximate to an edge of the set of pixels. Any number of boundaries 118 may be automatically generated based on the determined focal region 114.

In some implementations, at 412, user input 112 may be received to select, edit, add, or remove one or more of the boundaries 118. For example, based on one or more viewing rules 214, viewing data 116 may be generated that includes boundaries 118 corresponding to multiple types of output devices 204. User input 112 may then select one or more of the boundaries 118 for inclusion in the viewing data 116 or removal from the viewing data 116. User input 112 may also be used to change the size or shape of one or more boundaries 118. In other implementations, the viewing data 116 may be automatically generated in the absence of user input 112, and block 412 may be omitted.

As another example, at 414, one or more dimensions or other characteristics of an output device 204 may be determined. For example, if an output device 204 that receives the modified video data 102(2) includes a display having a certain length and width, device data indicative of these characteristics may be accessed. In some implementations, device data may be received from the output device 204. In other implementations, the output device 204 may, itself, generate the viewing data 116. In still other implementations, preexisting device data indicative of the characteristics of the output device 204 may be accessed. In other implementations, user input 112 indicating the characteristics of the output device 204 may be received.

At 416, viewing data 116 indicative of a boundary 118 that corresponds to at least one dimension of the output device 204 may be generated. For example, an output device 204 may include a smartphone oriented vertically (e.g., in portrait mode), such that the display area of the smartphone has a height greater than its width. In response to determining one or more dimensions of the display area, viewing data 116 including a boundary 118 having a width corresponding to the width of the smartphone display area may be generated.

In some implementations, at 418, user input 112 may be received confirming or modifying the boundary 118 that was determined. For example, a user may change the size, shape, or location of the boundary 118 via user input 112. In other implementations, the viewing data 116 may be automatically generated in the absence of user input 112, and block 418 may be omitted.

At 420, the first video data 102(1) may be modified based on the viewing data 116, to form second video data 102(2) representative of the second set of pixels, and at 422, the second video data 102(2) may be provided to an output device 204. As described with regard to FIGS. 1-3, modification of the first video data 102(1) may include deletion of pixels located outside of the boundary 118 indicated in the viewing data 116, or suppression of output of the pixels outside of the boundary 118, such that the second set of pixels has at least one dimension smaller than that of the first set of pixels.

Figure 5:
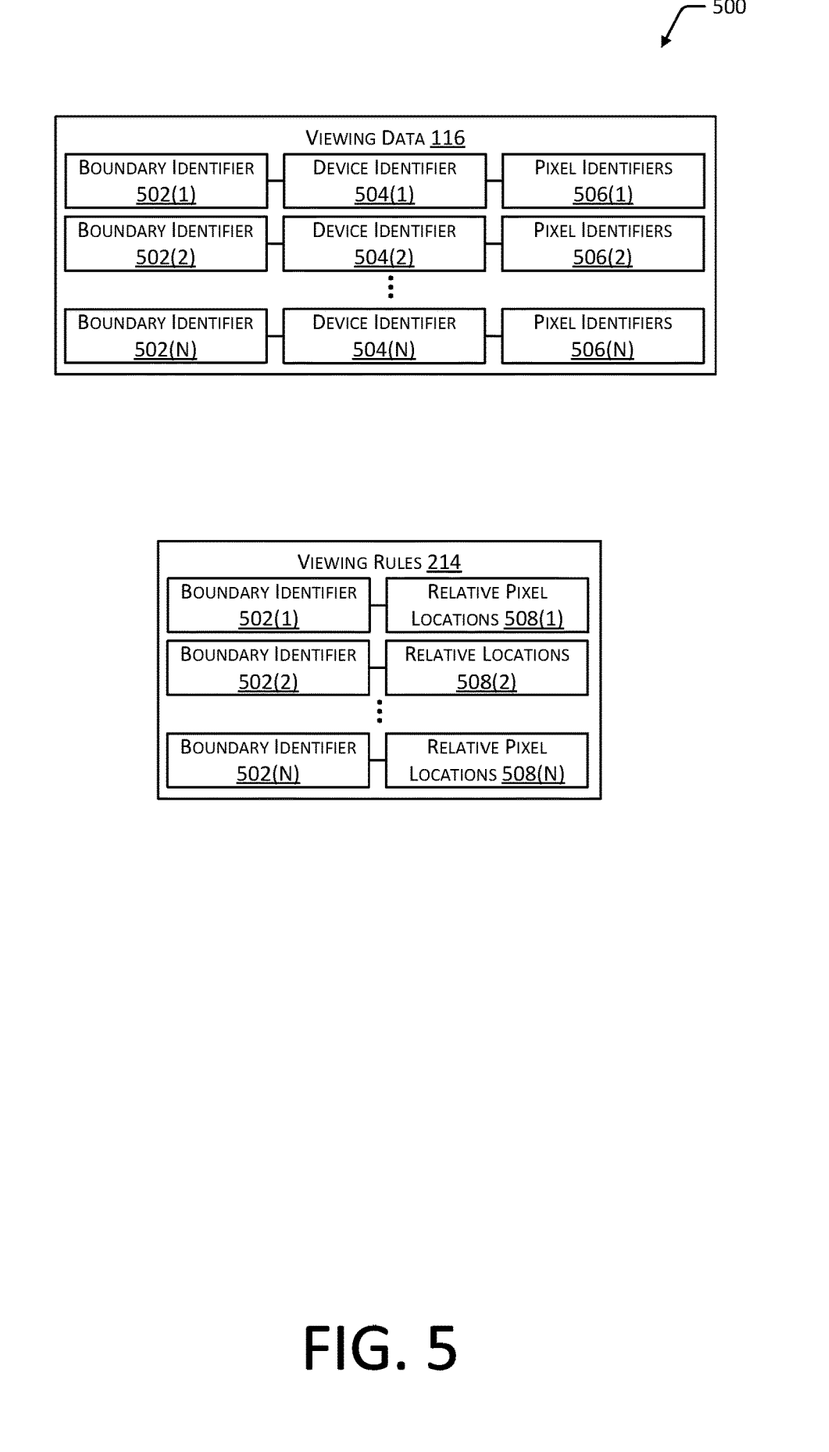
FIG. 5 is a block diagram illustrating example implementations of viewing data and viewing rules.

FIG. 5 is a block diagram 500 illustrating example implementations of viewing data 116 and viewing rules 214. As described with regard to FIGS. 1-4, viewing data 116 may include an indication of one or more pixels that correspond to one or more boundaries 118 of a second set of pixels contained within the initial set of pixels of a video. For example, a video may include a series of frames (e.g., images), each frame having a set of pixels. Each frame may have a particular set of dimensions. For example, a frame of a video recorded using a smartphone oriented horizontally may have a rectangular shape with a width of 1334 pixels and a height of 750 pixels. A frame of a video recorded using the smartphone oriented vertically may have a rectangular shape with a width of 750 pixels and a height of 1334 pixels. A boundary 118 of the viewing data 116 may enclose a subset of the pixels included within the frame of a video. For example, if video data 102 is generated using a smartphone oriented horizontally, a boundary 118 may enclose a subset of pixels intended for output using a smartphone that is oriented vertically. As such, the enclosed subset of pixels may have a width less than the width of the initial set of pixels represented by the video data 102. Viewing data 116 may include any number of boundaries 118, each boundary 118 corresponding to a different subset of pixels of the initial video data 102.

As such, FIG. 5 depicts the viewing data 116 including a first boundary identifier 502(1) stored in association with a first device identifier 504(1), and a first set of pixel identifiers 506(1). Similarly, a second boundary identifier 502(2) is shown associated with a second device identifier 504(2) and a second set of pixel identifiers 506(2). Any number of boundary identifiers 502(N) may be stored in association with any number of corresponding device identifiers 504(N) and pixel identifiers 506(N). Additionally, while FIG. 5 depicts single boundary identifiers 502 stored in association with single device identifiers 504 and single sets of pixel identifiers 506, in other implementations, a single boundary identifier 502 may correspond to multiple device identifiers 504 or a single device identifier 504 may correspond to multiple boundary identifiers 502. For example, a single boundary 118 may be used to modify video data 102 for output on multiple types of output devices 204.

A boundary identifier 502 may include any manner of data that may be used to differentiate a particular boundary 118 from other boundaries 118 of the viewing data 116. For example, a boundary identifier 502 may include a name or other alphanumeric string, an indicator of the shape or dimensions of a boundary 118 or other characteristics of the boundary 118, or any other type of data.

A device identifier 504 may include an indication of one or more device characteristics that correspond to the boundary 118 indicated by the boundary identifier 502. For example, a device identifier 504 may include an indication of one or more dimensions of a display area. Continuing the example, a particular boundary 118 may enclose a subset of pixels. In other implementations, a device identifier 504 may include an indication of a type associated with a viewing device 104, or an identification of a particular viewing device 104, such as a network identifier or device name. For example, a device identifier 504 may indicate a specific device, and the particular boundary 118 associated with that device identifier 504 may correspond to the characteristics of the device.

Pixel identifiers 506 may indicate the particular pixels of one or more frames of a video that correspond to a boundary 118. In other implementations, the pixel identifiers 506 may indicate a particular subset of pixels to be retained when the video data 102 is modified or a particular subset of pixels to be removed or suppressed when the video data 102 is modified. For example, the pixel identifiers 506 that correspond to a particular boundary identifier 502 may indicate a set of pixels where a boundary 118 is located or a set of pixels enclosed by the boundary 118. In other cases, the pixel identifiers 506 may not necessarily correspond to pixels located in a contiguous region. For example, a boundary identifier 502 may correspond to boundaries 118 of multiple enclosed shapes or disparate pixels or groups of pixels.

Viewing rules 214 may include one or more rules, algorithms, threshold values, or other data that may be used to generate the viewing data 116 based on a particular focal region 114 or device characteristics. For example, viewing rules 214 may indicate the locations of pixels included in particular boundaries 118 relative to the location of a focal region 114. Continuing the example, FIG. 5 depicts the viewing rules 214 associating a first boundary identifier 502(1) with a first set of relative pixel locations 508(1) and a second boundary identifier 502(2) with a second set of relative pixel locations 508(2). Viewing rules 214 may associate any number of boundary identifiers 502(N) with any number of relative pixel locations 508(N).

Relative pixel locations 508 may include locations of one or more pixels of a boundary 118, relative to a determined focal region 114. For example, a relative pixel location 508 for a particular pixel may indicate a direction and distance from a determined focal region 114, such that a set of relative pixel locations 508 correspond to pixels that form a rectangular-shaped boundary 118 having the focal region 114 at the approximate center of a width thereof. In other cases, relative pixel locations 508 may include fixed locations. For example, the viewing rules 214 may cause all boundaries 118 to include the bottom border of a video, independent of the location of the focal region 114 or the characteristics of the viewing device 104. As another example, if a focal region 114 is within a threshold distance of an edge of a set of pixels, the relative pixel locations 508 may include at least a portion of the edge of the set of pixels.

Figure 6:
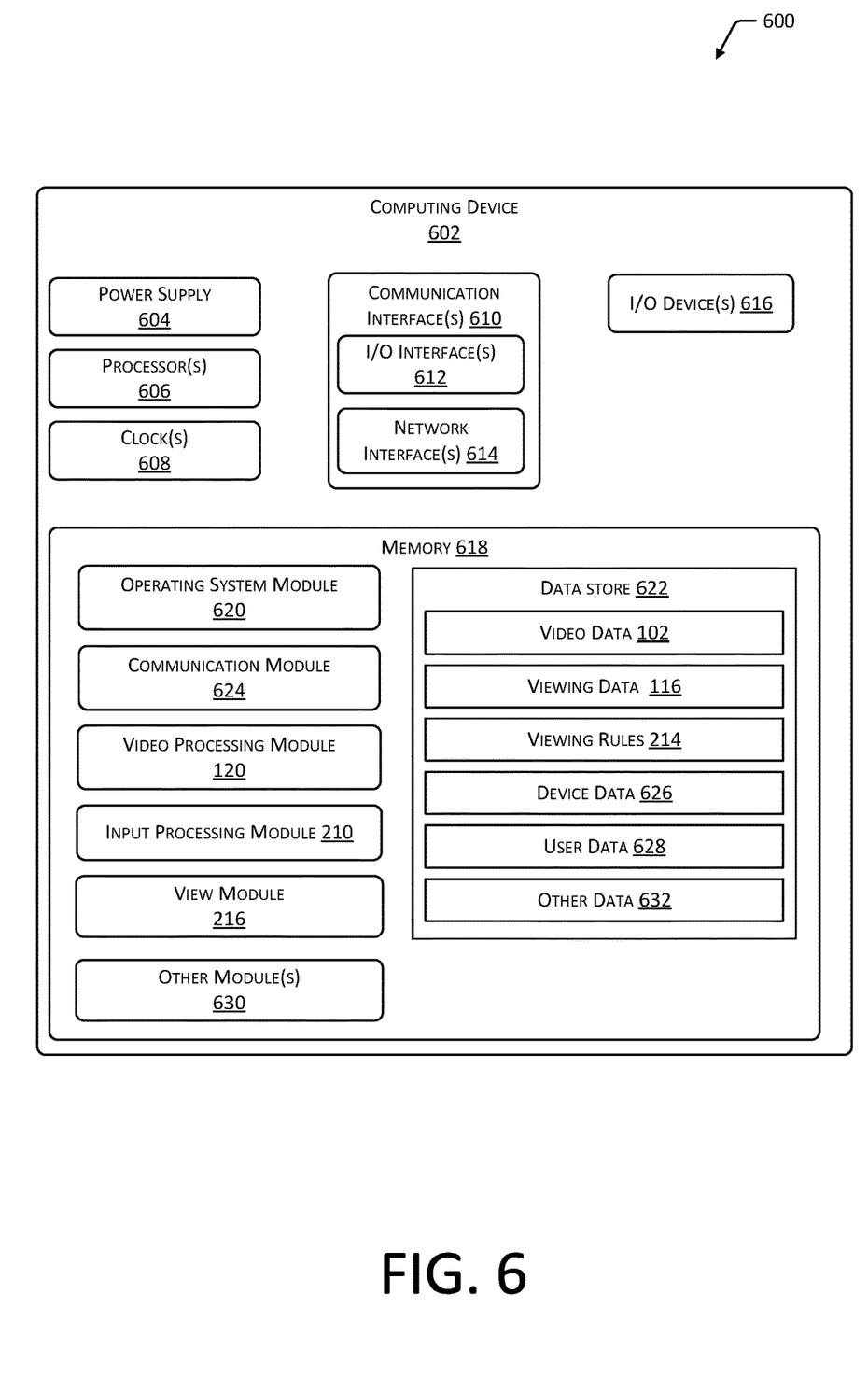
FIG. 6 is a block diagram illustrating a computing device within the scope of the present disclosure.

FIG. 6 is a block diagram 600 illustrating a computing device 602 within the scope of the present disclosure. The computing device 602 may include one or more recording devices 106, viewing devices 104, or other computing devices 602 in communication with one or more of a recording device 106 or viewing device 104 and configured to access video data 102. While FIG. 6 depicts a single block diagram 600 representative of a computing device 602, any number of networked computing devices 602 may perform the implementations described herein. For example, a recording device 106 may be used to determine a focal region 114 and generate viewing data 116, while a viewing device 104 is used to modify the video data 102 based on the viewing data 116. In other cases, the recording device 106, or another computing device 602 that accesses the video data 102 may modify the video data 102 based on the viewing data 116 and provide the modified video data 102(2) to the viewing device 104. In still other implementations, a computing device 602 separate from the recording device 106 may be used to determine focal regions 114 and generate viewing data 116. Any number and any combination of computing devices 602 including but not limited to the recording device 106 and viewing device 104 may be used to perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device 208 or output device 204 associated with the computing device 602. For example, I/O devices 616 may include touch sensors, keyboards, mouse devices, microphones, image sensors (e.g., cameras), scanners, displays, speakers, haptic devices, printers, weight sensors, code reading devices, RFID devices, NFC devices, and so forth. In some implementations, the I/O devices 616 may be physically incorporated with the computing device 602 or may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the video processing module 120. The video processing module 120 may modify initial video data 102, based on viewing data 116. For example, initial video data 102 may include a first set of pixels, while the viewing data 116 indicates a boundary 118 enclosing a second set of pixels within the first set. Modification of the initial video data 102 may include deletion or removal of pixels outside of the boundary 118, or otherwise suppressing the pixels outside of the boundary 118 from output.

The memory 618 may also store the input processing module 210. The input processing module 210 may receive and process user input 112 from one or more input devices 208. For example, the input processing module 210 may determine a focal region 114 based on user input 112 indicating a particular location within a video. As another example, the input processing module 210 may generate or modify viewing data 116 based on user input 112 indicating a location of a boundary 118 or selecting an existing boundary 118 for use, modification, or removal.

The memory 618 may additionally store the view module 216, which may generate viewing data 116 based on viewing rules 214, user input 112, or combinations of viewing rules 214 and user input 112. For example, the view module 216 may automatically generate one or more boundaries 118 based on a determined focal region 114 and one or more viewing rules 214, then user input 112 may be used to modify the generated boundaries 118. In some implementations, the view module 216 may generate viewing data 116 based on device data 626, which may indicate characteristics of an output device 204 such as the size of a display area. In other implementations, the view module 216 may generate viewing data 116 based on user data 628, which may indicate selections, preferences, default values, and so forth associated with a particular user of the computing device 602.

Other modules 630 may also be present in the memory 618. For example, encryption modules may be used to encrypt and decrypt communications between computing devices 602. Authentication modules may be used to authenticate communications sent or received by computing devices 602. Other modules 630 may also include modules for detecting characteristics of a computing device 602, such as a current orientation of the computing device 602. For example, a computing device 602 may receive initial video data 102 and viewing data 116 and may modify the initial video data 102 based on a current orientation of the computing device 602. Continuing the example, a particular boundary 118 of the viewing data 116 may correspond to the current orientation of the computing device 602. If the orientation of the computing device 602 is changed, a different boundary 118 of the viewing data 116 may correspond to the modified orientation of the computing device 602, and the video data 102 may then be modified based on the other boundary 118.

Other data 632 within the data store(s) 622 may include user input data, such as configurations, settings, preferences, and default values associated with computing devices 602. Other data 632 may include encryption keys and schema, access credentials, and so forth.

In different implementations, different computing devices 602 may have different capabilities or capacities. For example, servers that communicate with recording devices 106 and viewing devices 104 may have greater processing capabilities or data storage capacity than the recording devices 106 or viewing devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   accessing first video data indicative of a first plurality of pixels, wherein the first video data is associated with a first output having a first linear dimension;
   receiving first user input indicative of a subset of the first plurality of pixels;
   in response to the first user input, generating viewing data indicative of a boundary of a second plurality of pixels that includes at least the subset of the first plurality of pixels, wherein a location of the boundary is determined relative to the subset of the first plurality of pixels indicated by the first user input;
   based on the viewing data, generating second video data indicative of the second plurality of pixels, wherein the second video data excludes at least a portion of the first plurality of pixels and is associated with a second output having a second linear dimension smaller than the first linear dimension; and
   providing the second video data to an output device.

2. The method of claim 1, further comprising:
   determining, based on the first video data and the first user input, an object that corresponds to the subset of the first plurality of pixels; and
   generating the viewing data to position the object within the boundary of the second plurality of pixels.

3. The method of claim 1, the second video data is generated prior to providing the second video data to a viewing device associated with the output device.

4. The method of claim 1, further comprising:
   providing the first video data and the viewing data to a viewing device associated with the output device, wherein the viewing device is configured to generate the second video data based on the first video data and the viewing data.

5. The method of claim 1, further comprising:
   determining a size of a display area associated with the output device; and
   generating the viewing data to include an output size of the second plurality of pixels that is within a threshold tolerance of the size of the display area.

6. The method of claim 1, further comprising:
determining movement of the subset of the first plurality of pixels from a first location to a second location;
determining that a first distance between the first location and the second location exceeds a threshold distance; and
modifying the viewing data to move the boundary a second distance toward the second location that is less than or equal to the threshold distance.

7. The method of claim 1, wherein the first user input indicates the boundary of the second plurality of pixels, and the viewing data is generated based on the first user input.

8. The method of claim 1, further comprising:
generating output indicative of the boundary of the second plurality of pixels; and
receiving second user input modifying the boundary;
wherein the viewing data is further determined based on the second user input.

9. A system comprising:
one or more memories storing computer-executable instructions; and
one or more hardware processors to execute the computer-executable instructions to:
access first video data indicative of a first plurality of pixels, wherein the first video data is associated with a first output having a first linear dimension;
determine a focal region within the first plurality of pixels;
generate first viewing data indicative of a second plurality of pixels within the first plurality of pixels, wherein the second plurality of pixels includes the focal region;
based on the first viewing data, generate second video data indicative of the second plurality of pixels, wherein the second video data excludes at least a portion of the first plurality of pixels and is associated with a second output having a second linear dimension smaller than the first linear dimension; and
provide the second video data to an output device.

10. The system of claim 9, further comprising computer-executable instructions to:
receive user input indicating the focal region;
determine an object within a threshold distance of the focal region; and
generate the first viewing data to include the object within the second plurality of pixels.

11. The system of claim 9, further comprising computer-executable instructions to:
determine movement of a subset of the first plurality of pixels; and
determine the focal region within the subset of the first plurality of pixels.

12. The system of claim 9, wherein the first viewing data includes a plurality of points that define a boundary of the second plurality of pixels, and the second video data is generated by removing a portion of the first plurality of pixels not included in the second plurality of pixels.

13. The system of claim 9, further comprising computer-executable instructions to:
receive user input indicative of a boundary of the second plurality of pixels; and
determine the focal region based on the user input.

14. The system of claim 9, further comprising computer-executable instructions to:
determine that a size of a display area of the output device corresponds to the second linear dimension; and
modify the first video data to form the second video data prior to providing the second video data to a viewing device that includes the output device.

15. The system of claim 9, further comprising computer-executable instructions to:
generate output indicative of a boundary of the second plurality of pixels;
receive user input modifying the boundary; and
modify the first viewing data based on the user input.

16. The system of claim 9, further comprising computer-executable instructions to:
receive user input indicating the focal region, wherein the first viewing data is generated based on the user input.

17. A system comprising:
one or more memories storing computer-executable instructions; and
one or more hardware processors to execute the computer-executable instructions to:
receive first video data corresponding to a first plurality of pixels, wherein the first plurality of pixels has a first width;
receive first user input indicating a first portion of the first plurality of pixels as a focal region of the first video data;
generate viewing data indicating a subset of the first plurality of pixels, wherein the subset includes a second plurality of pixels having a boundary that is within the first plurality of pixels, the focal region is within the second plurality of pixels, and the second plurality of pixels has a second width less than the first width; and
provide the first video data and the viewing data to a viewing device to cause the viewing device to output second video data corresponding to the second plurality of pixels, wherein the second plurality of pixels excludes at least a second portion of the first plurality of pixels, the first video data is associated with a first output having a first linear dimension, and the second video data is associated with a second output having a second linear dimension smaller than the first linear dimension.

18. The system of claim 17, further comprising computer-executable instructions to:
determine an object within the first video data that corresponds to the first portion indicated by the first user input; and
generate the viewing data to position the object within a threshold distance of a center of the second width of the second plurality of pixels.

19. The system of claim 17, further comprising computer-executable instructions to:
generate output indicative of the boundary of the second plurality of pixels;
receive second user input modifying the boundary; and
modify the viewing data based on the second user input.

20. The system of claim 17, wherein the first user input indicates the boundary of the second plurality of pixels, and the viewing data is generated based on the boundary.

* * * * *